United States Patent
Yoshino

(10) Patent No.: US 10,228,697 B2
(45) Date of Patent: Mar. 12, 2019

(54) AUTONOMOUS MOBILE OBJECT AND AUTONOMOUS MOBILE OBJECT SYSTEM

(71) Applicant: Sharp Kabushiki Kaisha, Sakai, Osaka (JP)

(72) Inventor: Shoki Yoshino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 207 days.

(21) Appl. No.: 15/502,587

(22) PCT Filed: Jan. 28, 2015

(86) PCT No.: PCT/JP2015/052322
§ 371 (c)(1),
(2) Date: Feb. 8, 2017

(87) PCT Pub. No.: WO2016/031263
PCT Pub. Date: Mar. 3, 2016

(65) Prior Publication Data
US 2017/0235312 A1 Aug. 17, 2017

(30) Foreign Application Priority Data
Aug. 27, 2014 (JP) .................................. 2014-173268

(51) Int. Cl.
*G05D 1/02* (2006.01)
*A47L 11/283* (2006.01)
(Continued)

(52) U.S. Cl.
CPC .......... *G05D 1/0219* (2013.01); *A47L 11/283* (2013.01); *A47L 11/4005* (2013.01);
(Continued)

(58) Field of Classification Search
CPC .......................... A47L 11/283; A47L 11/4005; A47L 11/4008; A47L 11/4011; A47L 11/4016;
(Continued)

(56) References Cited

U.S. PATENT DOCUMENTS 9,273,973 B2 * 3/2016 Sakamoto ............ G05D 1/0214
2007/0282484 A1 * 12/2007 Chung ................. G05D 1/0274
700/245

(Continued)

FOREIGN PATENT DOCUMENTS

| JP | 2011-065202 A | 3/2011 |
| JP | 2011-076559 A | 4/2011 |

(Continued)

*Primary Examiner* — Rachid Bendidi
(74) *Attorney, Agent, or Firm* — Keating & Bennett, LLP

(57) ABSTRACT

The extent of the movement area of an autonomous mobile object is appropriately fed back for the extent of the movement area in the next operation at a low cost. An autonomous mobile object (1) includes an operation result map creation unit (21) that creates, on the basis of a log of the position of a cleaning brush (9), an operation result map in which a cleaned area is indicated, and a next-cleaning-area setting unit (22) that sets a next cleaning area on the basis of the operation result map displayed on an operation panel (13).

9 Claims, 11 Drawing Sheets

(51) Int. Cl.
 *A47L 11/40* (2006.01)
 *B25J 5/00* (2006.01)
 *G05D 1/00* (2006.01)

(52) U.S. Cl.
 CPC ....... *A47L 11/4008* (2013.01); *A47L 11/4011* (2013.01); *A47L 11/4016* (2013.01); *A47L 11/4038* (2013.01); *A47L 11/4044* (2013.01); *A47L 11/4066* (2013.01); *A47L 11/4072* (2013.01); *A47L 11/4075* (2013.01); *A47L 11/4077* (2013.01); *A47L 11/4083* (2013.01); *A47L 11/4088* (2013.01); *B25J 5/007* (2013.01); *G05D 1/0044* (2013.01); *A47L 2201/04* (2013.01); *A47L 2201/06* (2013.01); *G05D 2201/0203* (2013.01)

(58) Field of Classification Search
 CPC ............. A47L 11/4038; A47L 11/4044; A47L 11/4066; A47L 11/4072; A47L 11/4075; A47L 11/4077; A47L 11/4083; A47L 11/4088; A47L 2201/06; B25J 5/007; G05D 1/02; G05D 1/0219; G05D 2201/0203
 See application file for complete search history.

(56) References Cited

U.S. PATENT DOCUMENTS

2011/0178669 A1* 7/2011 Tanaka ................. G05D 1/0272
 701/25
2014/0316636 A1* 10/2014 Hong ................... G05D 1/0016
 701/27

FOREIGN PATENT DOCUMENTS

JP 2014-071846 A 4/2014
JP 2014-085829 A 5/2014

* cited by examiner

FIG. 16

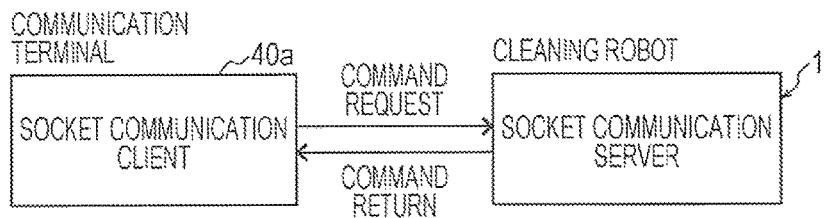

FIG. 17

EXAMPLE COMMANDS

| COMMUNICATION TERMINAL 40a | CLEANING ROBOT 1 |
|---|---|
| COMMAND REQUEST | COMMAND RETURN |
| MAP REQUEST | WIDTH OF MAP, LENGTH OF MAP, ATTRIBUTES OF GRIDS (WALL, NOT CLEANED, CLEANED) |
| COMMAND FOR CLEANING AREA, SPECIFIED AREA | RECEPTION OF REQUEST COMPLETED |
| COMMAND FOR CLEANING-PROHIBITED AREA, SPECIFIED AREA | RECEPTION OF REQUEST COMPLETED |
| COMMAND FOR PRIORITY CLEANING AREA, SPECIFIED AREA | RECEPTION OF REQUEST COMPLETED |

AUTONOMOUS MOBILE OBJECT AND AUTONOMOUS MOBILE OBJECT SYSTEM

TECHNICAL FIELD

The present invention relates to an autonomous mobile object, such as a cleaning robot, that autonomously moves and performs operations, and to an autonomous mobile object system.

BACKGROUND ART

A mobile object, such as an autonomous mobile robot, that can autonomously move within a limited area inside or outside a building on the basis of information about its environment is known. Such a mobile object creates a movement path from its current position to a specific target position on an environment map of a movement area stored in advance to allow autonomous movement along the path. Therefore, the autonomous mobile object is typically provided with a function of recognizing its position in the movement area.

The autonomous mobile object performs a specific operation while traveling, which is one of its objectives. For example, a cleaning robot travels throughout an area to be cleaned while collecting dust.

The autonomous mobile object that travels while performing an operation is required to adequately complete the operation. In a case where the operation is not adequately performed, the autonomous mobile object needs to compensate for the inadequate operation. That is, the autonomous mobile object needs to evaluate whether the result of operation is adequate or not and to perform a certain feedback operation if the operation is inadequate. For example, a cleaning robot has an evaluation criterion that is based on whether the cleaning robot has successfully cleaned everywhere in a cleaning area.

As a technique for addressing the issue of the autonomous mobile object being required to perform a feedback operation on the basis of the result of operation, a device control apparatus and a self-propelled electronic device disclosed in PTL 1, for example, are known. With the device control apparatus and self-propelled electronic device disclosed in PTL 1, the travel log of the self-propelled electronic device is recorded and, in the next travel, the self-propelled electronic device preferentially travels through an area through which the self-propelled electronic device has less frequently traveled in the last travel to thereby travel throughout the entire area and make the operation appropriate.

Further, an autonomous traveling apparatus that can travel and reach a target position while autonomously avoiding obstacles is known (PTL 2).

CITATION LIST

Patent Literature

PTL 1: Japanese Unexamined Patent Application Publication No. 2014-85829 (published on May 12, 2014)
PTL 2: Japanese Unexamined Patent Application Publication No. 2011-76559 (published on Apr. 14, 2011)

SUMMARY OF INVENTION

Technical Problem

With the device control apparatus and self-propelled electronic device disclosed in PTL 1, the travel log of the self-propelled electronic device is automatically evaluated to make the next operation appropriate on the basis of the result of evaluation.

However, the technique disclosed in PTL 1 has the following problems.

In a case where an obstacle not recorded on the environment map of the movement area stored in advance is located within an actual movement area, an area through which the autonomous mobile object is unable to travel, or an area through which the autonomous mobile object has less frequently traveled in the last travel according to the travel log, is created. In this case, the autonomous mobile object is unable to clean the area because of the obstacle, and therefore, the area is likely to be an area through which the autonomous mobile object should not travel preferentially in the next travel if the obstacle is not removed at that time. In such a situation, according to the technique disclosed in PTL 1, the self-propelled electronic device attempts to preferentially travel through and clean the area through which the self-propelled electronic device has less frequently traveled in the last travel regardless of whether the self-propelled electronic device should preferentially travel through and clean the area.

Even if an object that is not recorded on the environment map is not present and an area through which the self-propelled electronic device has traveled a small number of times in the last travel exists, the area is likely to be an area that is originally less dirty and is not required to be preferentially cleaned. In this case, a dirt sensor is necessary for detecting whether the area is actually dirty or not, which causes a problem of an increased cost of the autonomous mobile object.

The autonomous traveling apparatus described in PTL 2 travels while autonomously avoiding obstacles; however, a configuration for making the next operation appropriate on the basis of the travel log is not suggested in PTL 2.

An object of the present invention is to provide an autonomous mobile object and an autonomous mobile object system with which the extent of the movement area of an autonomous mobile object that performs an operation while moving can be appropriately fed back for the extent of the movement area in the next operation at a low cost.

Solution to Problem

In order to solve the problem described above, an autonomous mobile object according to an aspect of the present invention includes: an operation unit that performs a predetermined operation while moving through an operation area for which the operation is to be performed; a detection unit that detects a position of the operation unit in the operation area; a creation unit that creates an operation result map indicating an area, within the operation area, through which the operation unit has moved as an operation-performed area on the basis of a log of the position of the operation unit detected by the detection unit; a display unit that displays the operation result map created by the creation unit; and a setting unit that sets, on the basis of the operation result map displayed on the display unit, a next movement area through which the operation unit moves to perform the operation next time.

Advantageous Effects of Invention

According to an aspect of the present invention, an effect is produced, that is, the extent of the movement area of an autonomous mobile object that performs an operation while moving can be appropriately fed back for the extent of the movement area in the next operation at a low cost.

BRIEF DESCRIPTION OF DRAWINGS

FIG. 16 is a block diagram illustrating a basic configuration of another cleaning robot system according to the fourth embodiment.

FIG. 17 is a diagram for describing example commands of the other cleaning robot system.

DESCRIPTION OF EMBODIMENTS

Hereinafter, embodiments of an autonomous mobile object and an autonomous mobile object system according to the present invention are described. In the embodiments, a cleaning robot, which is an example of the autonomous mobile object, is described; however, the present invention is not limited to the cleaning robot. The present invention is also applicable to an air cleaner, an image capture device, and various robot devices (a guard robot, a domestic robot, and an animal robot, for example).

First Embodiment (Configuration of Cleaning Robot 1)

Figure 1:
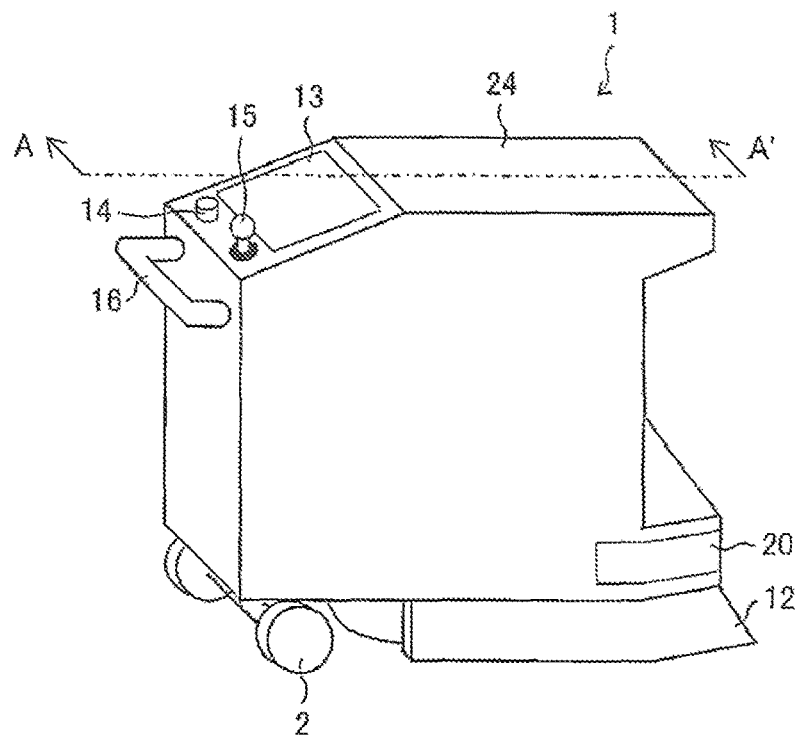
FIG. 1 is an external view of a cleaning robot according to a first embodiment.
Figure 2:
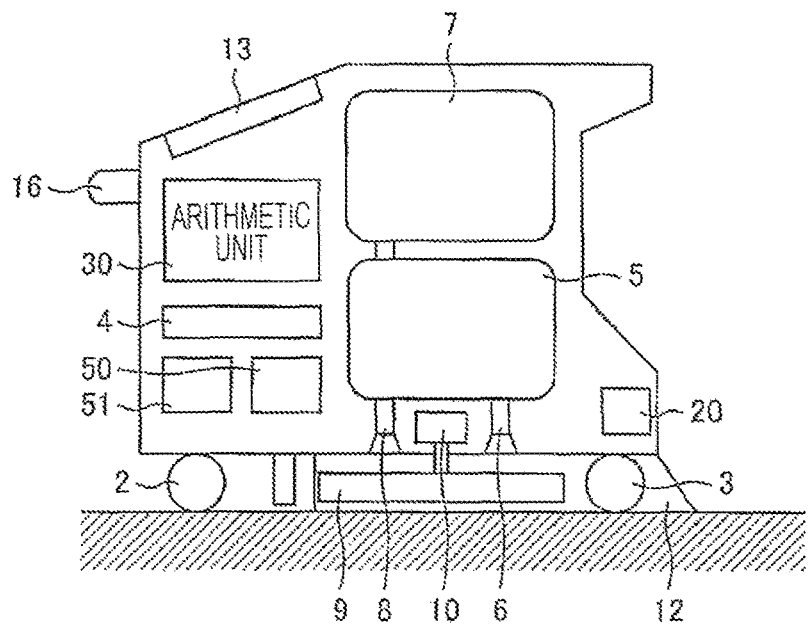
FIG. 2 is a cross-sectional view taken along line A-A' of FIG. 1.

FIG. 1 is an external view of a cleaning robot 1 (autonomous mobile object). FIG. 2 is a cross-sectional view taken along line A-A' of FIG. 1.

The cleaning robot 1 includes two driving wheels 2 that are respectively disposed to the left and to the right of the bottom of the cleaning robot 1, a trailing wheel 3 that is rotationally attached to the bottom of the cleaning robot 1, a battery 4 that supplies operating power to the cleaning robot 1, a motor 50 that drives the driving wheels 2, and an encoder 51 that detects the number of revolutions of the driving wheels 2. The cleaning robot 1 further includes a washing fluid tank 5 that stores a washing fluid and a washing fluid discharge portion 6 that is coupled to the washing fluid tank. The washing fluid tank 5 and the washing fluid discharge portion 6 are connected to each other via a cylindrical pipe to form a washing fluid discharge unit. The cleaning robot 1 further includes a waste fluid tank 7 that stores waste fluids (including dirt, dust, and so on) that are sucked into the cleaning robot 1 and a waste fluid suction inlet 8 which is provided on the bottom of the cleaning robot 1 and through which waste fluids are sucked. The waste fluid tank 7 and the waste fluid suction inlet 8 are connected to each other via a pipe to form a waste fluid collection unit. The cleaning robot 1 further includes a cleaning brush 9 (brush, first operation tool, operation unit) that is provided in the vicinity of the waste fluid suction inlet 8 and a brush motor 10 that drives the cleaning brush 9. The brush motor 10 includes a rotary encoder that allows detection of the number of revolutions of the brush motor 10. The entire mechanism described above is covered by a body 24. The cleaning robot 1 further includes a protection member 12 for preventing the washing fluid from spreading or foreign matters from being caught. The cleaning robot 1 further includes an operation panel 13 (display unit) used to set various modes, to switch between automatic traveling and manual traveling, and to switch between traveling and stopping, for example, an emergency stop switch 14 for stopping in case of emergency, a travel control lever 15 used to select the direction of travel in the case of manual traveling, and a handle 16 used by an operator to support the body 24 of the cleaning robot in the case of manual traveling.

Note that the form of the cleaning robot is not limited to the above-described type, which performs cleaning by using a washing fluid, and may be a robot of a form that includes a fan, a dust chamber, and a suction inlet, such as a household vacuum cleaner.

The cleaning robot 1 having such a configuration is able to perform movements, such as a straight forward movement, a curved movement (turn), a backward movement, and pivoting (rotation about the midpoint between the two wheels) by controlling the amounts of drive of the paired driving wheels 2 independently of each other. Furthermore, the cleaning robot 1 is implemented as a mobile object of an autonomous mobile type that autonomously creates a movement path up to a specified destination within its movement area and moves while following the movement path. Accordingly, the cleaning robot 1 according to the first embodiment includes a laser range finder 20 and an arithmetic unit 30.

Now, description of the laser range finder 20 and the arithmetic unit 30, and description of a control system that controls the autonomous movement of the cleaning robot 1 are given below.

(Configuration of Laser Range Finder 20)

The laser range finder 20 is disposed in a front portion of the cleaning robot 1. The laser range finder 20 includes a light source for emitting laser light in a forward direction of the cleaning robot 1 over a predetermined angle and a light receiving unit that receives reflected light resulting from the laser light emitted from the light source. Obstacle sensing based on the known TOF (Time-of-Flight) principle is performed by the laser range finder 20 in which the position of an obstacle by which laser light is reflected is detected on the basis of the angle at which the laser light is emitted and the time taken from the emission to the reflection.

Now, a technique for obtaining information about an environment (the position and shape of an obstacle to be sensed) in front of the cleaning robot 1 using the laser range finder 20 is described.

First, the cleaning robot 1 emits laser light in a forward direction thereof and detects the position (sensing point) of an obstacle that is present in a sensing area located within a predetermined distance from the cleaning robot 1 and that reflects the laser light. Specifically, the laser range finder 20 according to the first embodiment assumes an area at a predetermined distance from the cleaning robot 1 to be a range that is measurable through emission over a predetermined angle. That is, when reflected light resulting from the laser light emitted from the laser range finder 20 is received, the point at which the emitted laser light is reflected is identified from the position of the cleaning robot 1 at the time when the laser light was emitted, the emission direction of the laser light emitted from the laser range finder 20, and the time taken from the emission of the laser light to the reception of the reflected light.

Data obtained by the laser range finder 20 is output as a polar coordinate system defined by the distance from the center of the laser and by the angle of the laser emission direction. In a case where the resolution is set to 1.0 degree when measurement is performed in the forward direction of travel of the cleaning robot 1 over 180 degrees, the laser range finder 20 obtains 181 pieces of data in a single scan.

The data (distance to a wall) obtained by the laser range finder 20 is stored in a recording area provided in the arithmetic unit 30.

Figure 3:
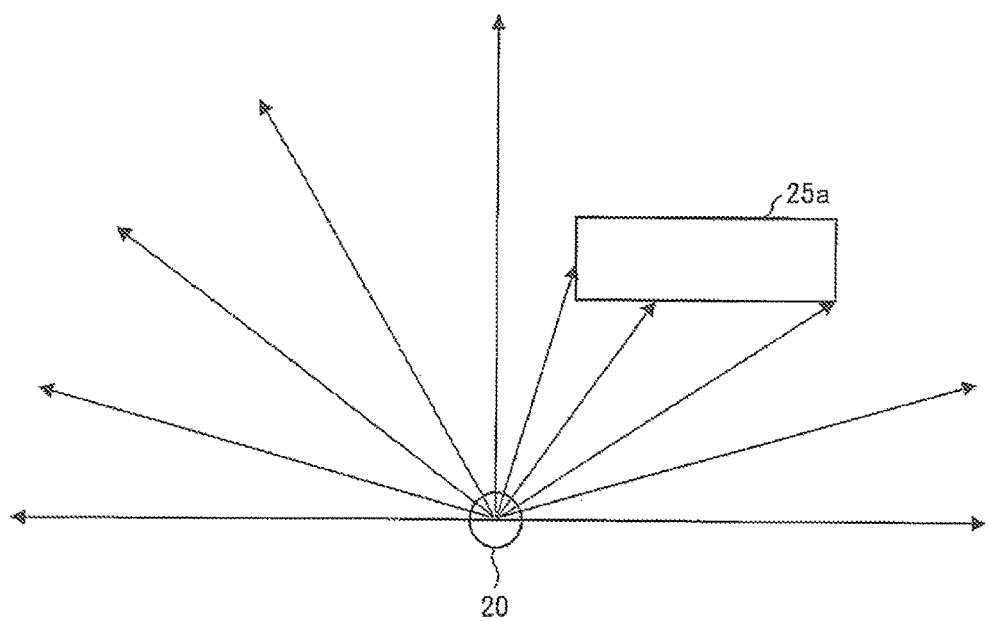
FIG. 3 is a diagram illustrating a laser range finder mounted on the cleaning robot illustrated in FIG. 1 and laser light from the laser range finder emitted to a wall, which is a ranging target.

FIG. 3 illustrates a state where a wall 25a is located in front of the cleaning robot 1 (laser range finder 20) in a cleaning area to be cleaned by the cleaning robot 1. As illustrated in FIG. 3, the cleaning robot emits laser light from the laser range finder 20 in a forward direction thereof. At this time, the wall 25a is included in the sensing area of the laser range finder 20. In this case, the distance to the wall 25a sensed by the laser range finder 20 is stored in the recording area (not illustrated) provided in the arithmetic unit 30.

(Configuration of Arithmetic Unit 30)

Figure 4:
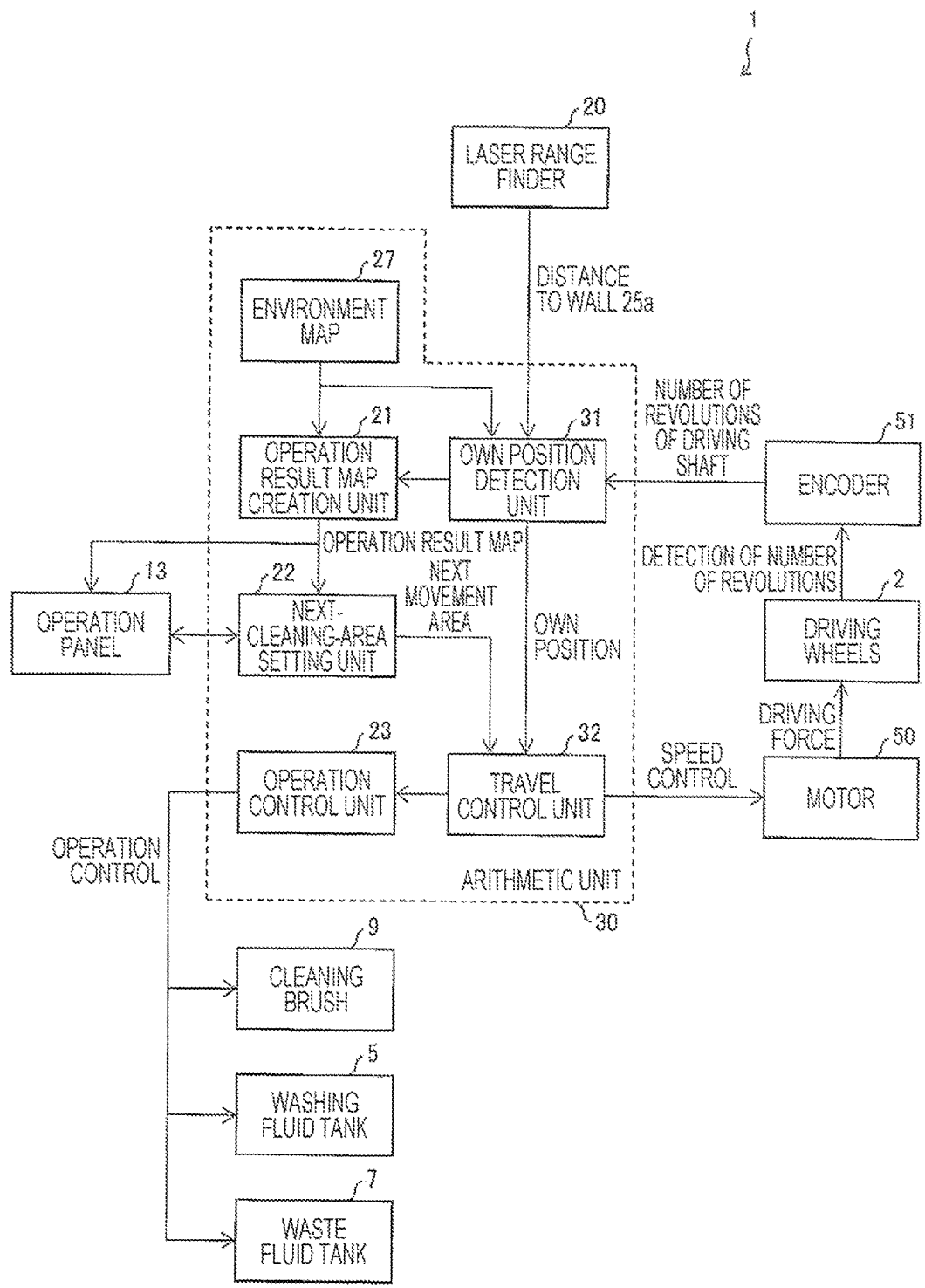
FIG. 4 is a diagram illustrating a configuration related to an arithmetic unit provided in the cleaning robot according to the first embodiment.

FIG. 4 is a diagram illustrating a configuration related to the arithmetic unit 30 provided in the cleaning robot 1 according to the first embodiment.

The arithmetic unit 30 controls overall operations of the cleaning robot 1. The arithmetic unit 30 includes an own position detection unit 31 (detection unit). The own position detection unit 31 detects the position of the body 24 in a cleaning area (operation area) that is an area to be cleaned by the cleaning robot 1. Specifically, the own position detection unit 31 detects the position of the body 24 in the cleaning area on the basis of an environment map 27 on which the cleaning area is recorded, the number of revolutions of the driving wheels 2 detected by the encoder 51, and the distance to the wall 25a sensed by the laser range finder 20.

The arithmetic unit 30 is provided with a travel control unit 32. The travel control unit 32 controls an operation control unit 23 and the motor 50 on the basis of the position of the body 24 in the cleaning area detected by the own position detection unit 31. The operation control unit 23 controls operations of the cleaning brush 9, the washing fluid tank 5, and the waste fluid tank 7 on the basis of a control instruction from the travel control unit 32. The motor 50 drives the driving wheels 2 on the basis of a control instruction from the travel control unit 32.

The arithmetic unit 30 includes an operation result map creation unit 21 (creation unit) and a next-cleaning-area setting unit 22 (setting unit). The operation result map creation unit 21 creates an operation result map on which an area, within the cleaning area, through which the body 24 has moved is indicated as a cleaned area (operation-performed area) on the basis of a log of the position of the body 24 in the cleaning area detected by the own position detection unit 31 and the environment map 27. The operation result map created by the operation result map creation unit 21 is displayed on the operation panel 13.

The next-cleaning-area setting unit 22 sets the next cleaning area (next movement area) through which the body 24 moves to perform cleaning next time on the basis of the operation result map displayed on the operation panel 13. The travel control unit 32 controls the motor 50 and the operation control unit 23 on the basis of the next cleaning area set by the next-cleaning-area setting unit 22.

The recording area (not illustrated) of the arithmetic unit 30 is an area used to store a program for controlling the movement speed, movement direction, and movement distance of the cleaning robot 1 on the basis of a control signal and the environment map 27 that includes information about the movement area of the cleaning robot 1 and about the position and shape of an obstacle (wall) present within the area.

(Configuration of Environment Map 27)

Figure 5:
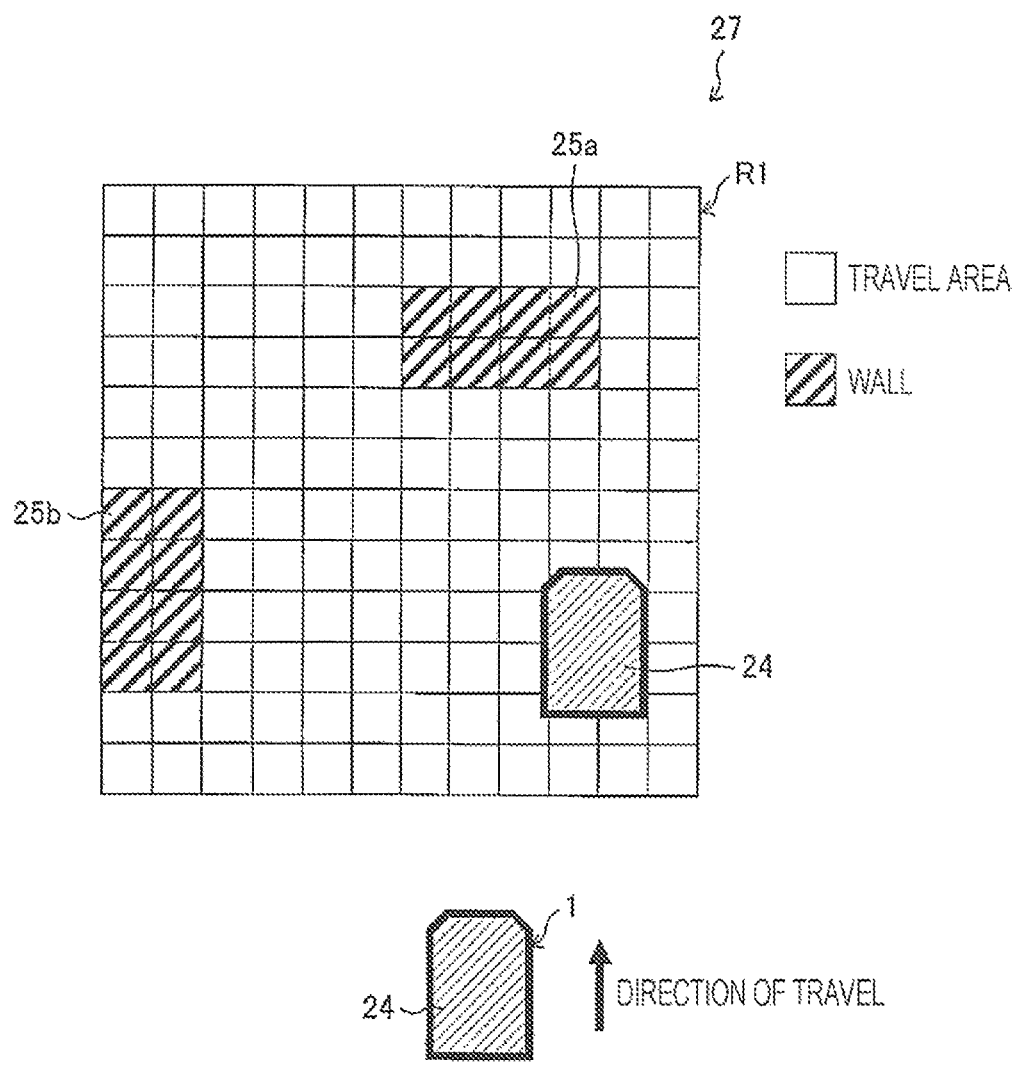
FIG. 5 is a diagram illustrating a relationship between the body of the cleaning robot and walls, which are considered to be obstacles, in a travel area of the cleaning robot.

FIG. 5 is a diagram illustrating the environment map 27 that indicates a relationship between the body 24 of the cleaning robot 1 and the wall 25a and a wall 25b, which are considered to be obstacles, in a travel area R1 of the cleaning robot 1.

As the environment map 27, a grid map created by virtually drawing grid lines that connect grid points arranged at substantially regular intervals in the travel area R1 having a square shape is used in this embodiment. FIG. 5 illustrates the grid map that is used as the environment map 27. The travel area R1 on the environment map 27 is constituted by square sub-areas arranged in 12 rows and 12 columns. The environment map 27 is a map that schematically indicates an area through which the body 24 of the cleaning robot 1 has moved, and presence information about obstacles, such as the walls 25a and 25b, is registered on the environment map 27.

Figure 6:
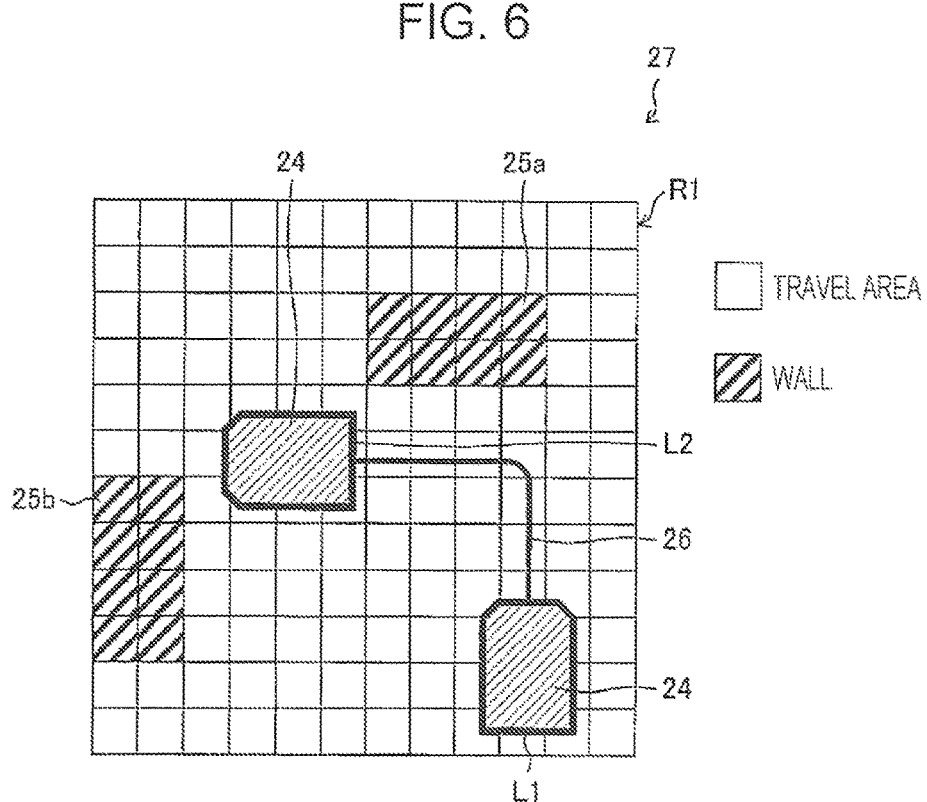
FIG. 6 is a diagram illustrating a travel path of the body in the travel area.
Figure 7:
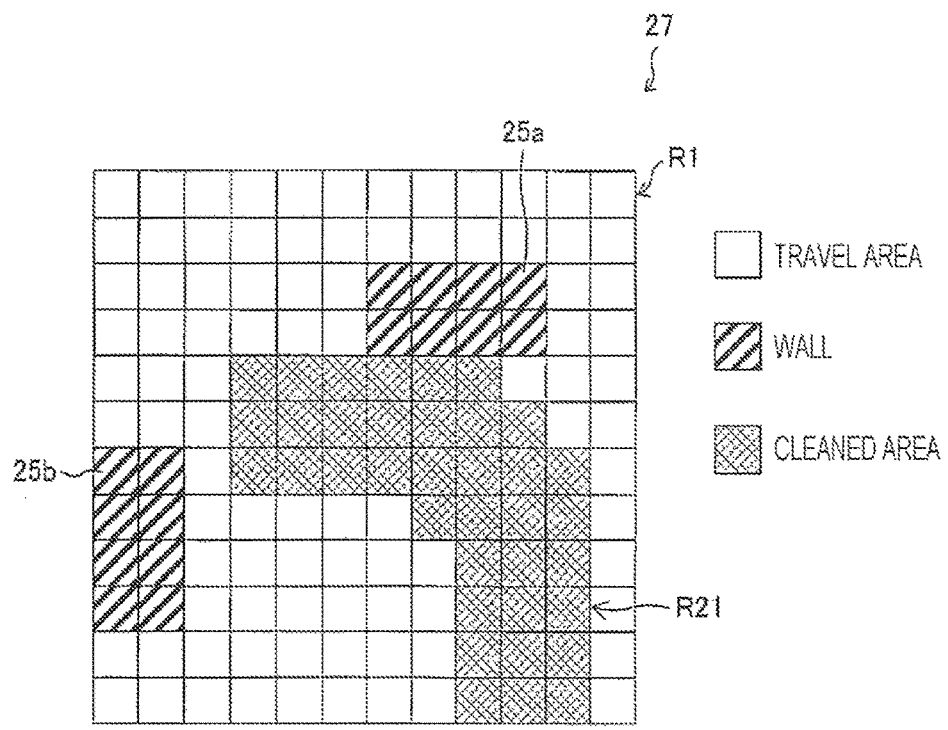
FIG. 7 is a diagram illustrating a cleaned area based on the travel path of the body.

FIG. 6 is a diagram illustrating a travel path of the body 24 in the travel area R1. FIG. 7 is a diagram illustrating a cleaned area R21 (operation-performed area) based on the travel path of the body 24.

In a case where the body 24 travels straight forward from an initial position L1, turns left, and travels up to a position L2 along a path 26, as illustrated in FIG. 6, the cleaned area R21 (operation-performed area) is formed by assuming an area through which the body 24 has passed as an area that has been cleaned on the basis of the shape and position of the body 24 of the cleaning robot 1, as illustrated in FIG. 7.

(Configuration of Operation Result Map 28a)

Figure 8:
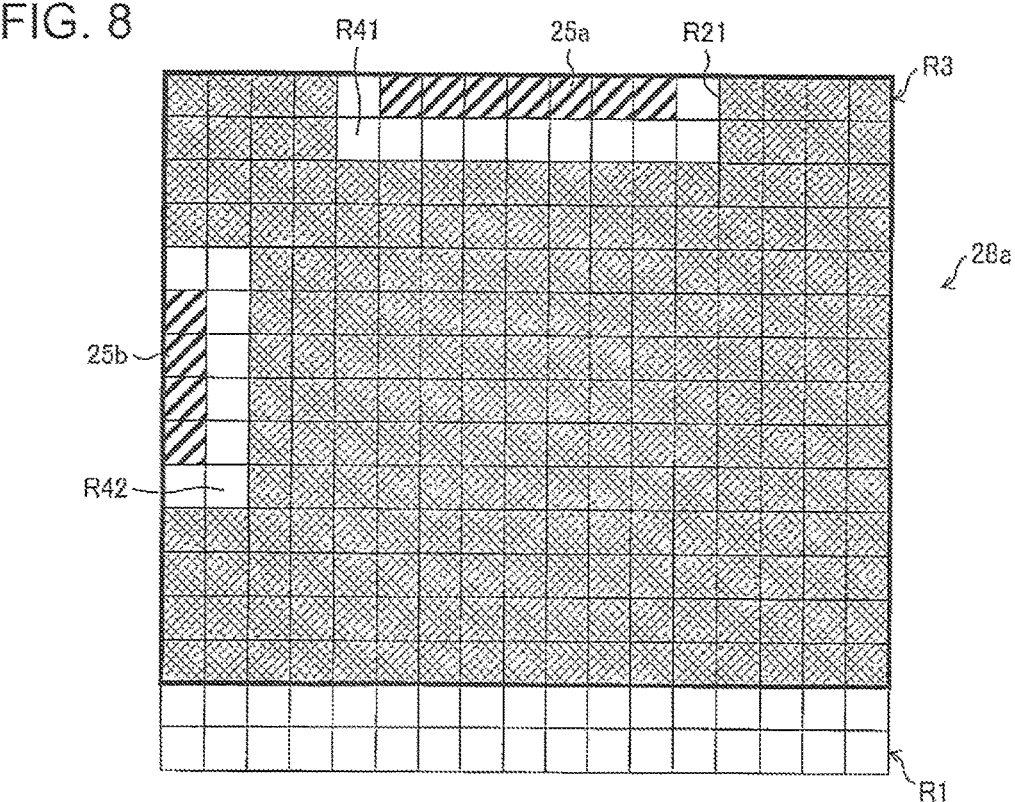
FIG. 8 is a diagram illustrating an operation result map based on the cleaned area.

FIG. 8 is a diagram illustrating an operation result map 28a based on the cleaned area R21. The operation result map 28a includes the travel area R1 which has a rectangular shape and through which the body 24 can travel. The travel area R1 in FIG. 8 is constituted by square sub-areas arranged in 16 rows and 17 columns. The travel area R1 includes a cleaning area R3 (operation area) having a rectangular shape to be cleaned by the cleaning robot 1. The cleaning area R3 is constituted by square sub-areas arranged in 14 rows and 17 columns. The wall 25a is arranged along the upper edge of the cleaning area R3. The wall 25a is constituted by square sub-areas arranged in one row and seven columns. The wall 25b is arranged along the left edge of the cleaning area R3. The wall 25b is constituted by square sub-areas arranged in four rows and one column.

A non-cleaned area R41 for which cleaning is not completed is indicated around the wall 25a. A non-cleaned area R42 for which cleaning is not completed is indicated around the wall 25b. In the cleaning area R3, the remaining area other than the walls 25a and 25b and the non-cleaned areas R41 and R42 is indicated as the cleaned area R21.

Cleaning has been successfully performed for most of the cleaning area R3; however, in the cleaning area R3, the non-cleaned area R41 around the wall 25a and the non-cleaned area R42 around the wall 25b remain as areas for which cleaning has failed because the areas are out of reach of the cleaning brush 9 provided in the body 24. Accordingly, the operation result map is effective in that, when the cleaned area R21 is indicated on the basis of the area through which the cleaning brush 9 mounted on the body 24 has traveled, a place that is out of reach of the cleaning brush 9 and is not cleaned is known.

(Configuration of Operation Result Map 28b)

Figure 9:
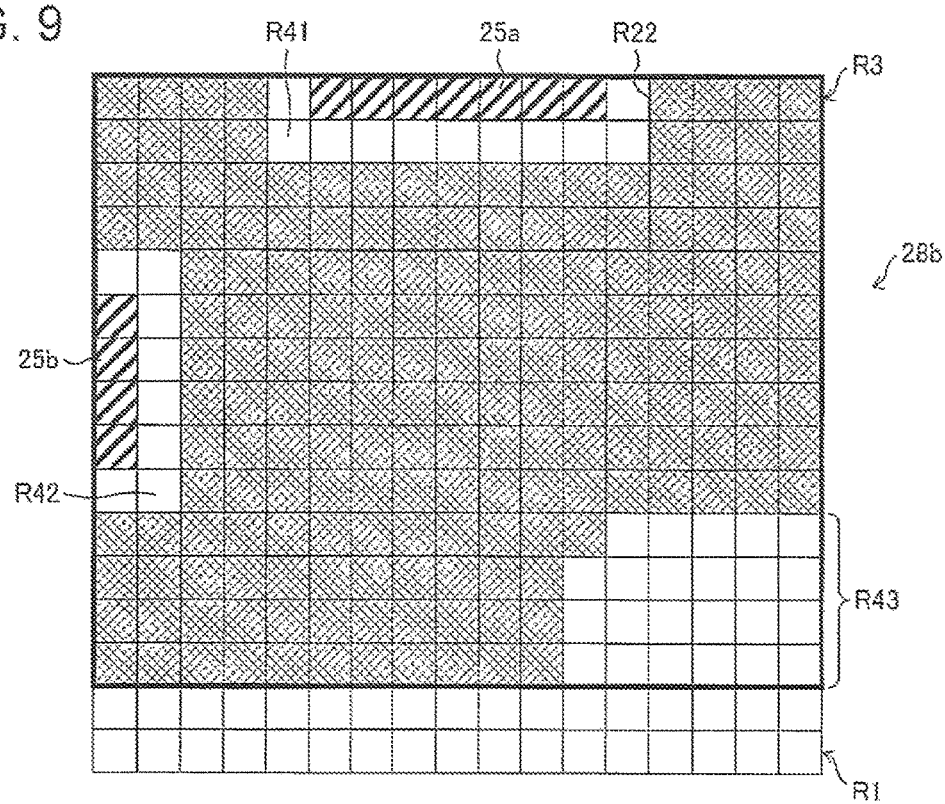
FIG. 9 is a diagram illustrating another operation result map based on another cleaned area.

FIG. 9 is a diagram illustrating an operation result map 28b based on another cleaned area R22. Constituent elements that are the same as those described with reference to FIG. 8 are assigned the same reference numerals, and detailed description thereof is not repeatedly given.

A substantially rectangular non-cleaned area R43 is indicated in a right lower area in the cleaning area R3. In the cleaning area R3, the remaining area other than the walls 25a and 25b, the non-cleaned areas R41 and R42, and the non-cleaned area R43 is indicated as the cleaned area R22.

(Setting Method for Next Cleaning Area)

FIG. 9 illustrates the operation result map 28b in a case where a cleaning operation is not adequately completed. The non-cleaned area R43, which is a portion for which cleaning has failed, exists at the bottom right of the cleaning area R3. The non-cleaned area R43 can be created in a case where an obstacle that is not indicated on the environment map 27 is left, for example. After cleaning, if the obstacle is not left at a position in the non-cleaned area R43 that has not been cleaned, an action, such as carefully cleaning the non-cleaned area R43 next time, is required in order to improve the quality of cleaning.

Even after the end of cleaning, if the obstacle remains at a position related to the non-cleaned area R43 for which cleaning has failed, and the obstacle is still present at the time of the next cleaning, cleaning of the non-cleaned area R43 for which cleaning has failed is not possible, and therefore, it is not necessary to perform setting for careful cleaning.

An obstacle not indicated on the environment map 27 is an exceptional environment for the autonomous mobile object, and a special process is required. For example, in a case where a travel path has been set and if the travel path becomes not passable, another travel path needs to be generated. That is, the process involves complicated determination, and therefore, traveling becomes slow depending on the situation. Accordingly, in a case where the obstacle that is not indicated on the environment map 27 is still present at the time of the next travel, it is desirable to update the environment map 27. The environment map 27 can be automatically updated; however, the obstacle might not be present at the time of the next cleaning. In this case, the updated environment map 27 still does not match the actual environment related to the obstacle, which causes inconvenience. Therefore, the details of the next cleaning process are appropriately determined by making the next-cleaning-area setting unit 22 provide the updated next cleaning area.

Figure 10:
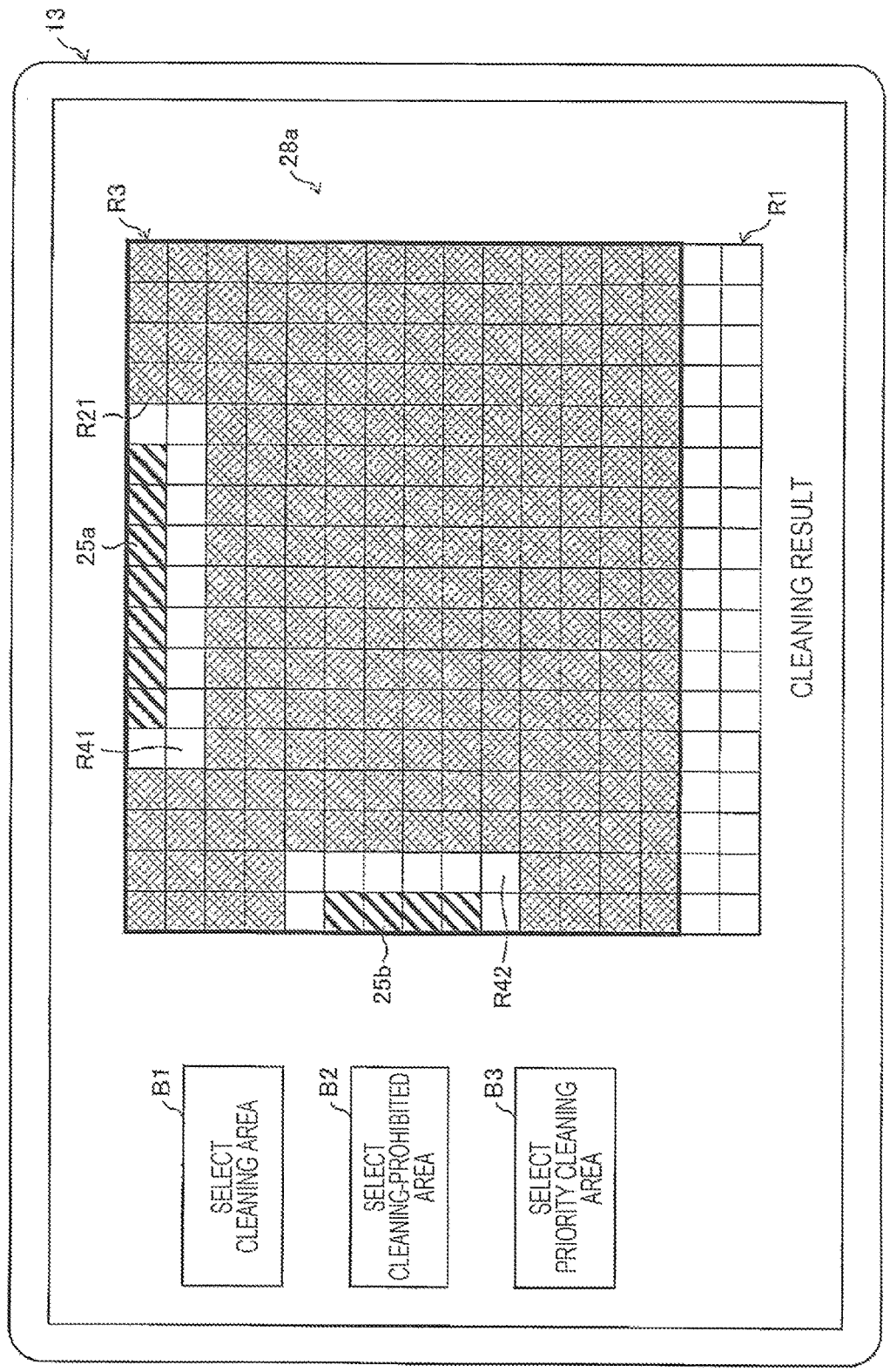
FIG. 10 is a diagram illustrating the operation result map displayed on an operation panel provided on the cleaning robot.

FIG. 10 is a diagram illustrating the operation result map 28a displayed on the operation panel 13 provided on the cleaning robot 1. On the operation panel 13, the operation result map 28a, a button B1 for selecting a cleaning area, a button B2 for selecting a cleaning-prohibited area (operation-prohibited area), and a button B3 for selecting a priority cleaning area are displayed.

Figure 11:
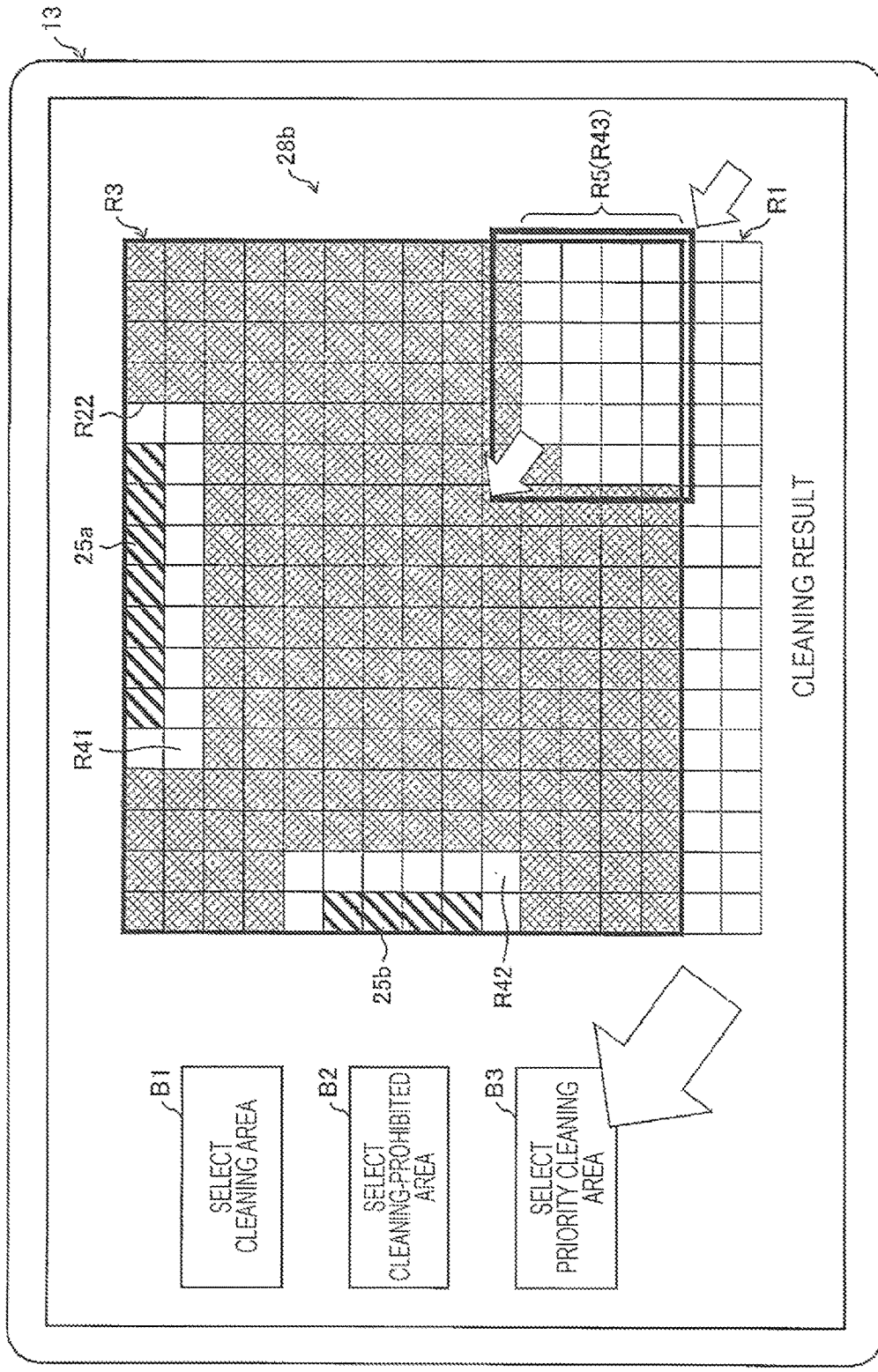
FIG. 11 is a diagram illustrating the other operation result map displayed on the operation panel.

FIG. 11 is a diagram illustrating the operation result map 28b displayed on the operation panel 13. A setting method related to an action to be taken in a case where the non-cleaned area R43 is created as a result of a failure in adequate cleaning is described.

In a case where it is known that, in the non-cleaned area R43 for which cleaning has failed due to the presence of an obstacle that is not indicated on the environment map 27, the obstacle is no longer present at the time of the next cleaning, it is decided to preferentially clean the non-cleaned area R43 in the next cleaning. In this case, after the button B3 has been pressed, a rectangular area can be used to select a priority cleaning area R5 (priority operation area) by performing a touch-and-drag operation for the non-cleaned area R43 for which cleaning is to be preferentially performed. With setting performed as a result of this selection, the cleaning robot 1 preferentially cleans the non-cleaned area R43 for which cleaning has failed in the previous cleaning as the priority cleaning area R5 in the next cleaning.

If an obstacle actually remains at the time of the next cleaning and thereafter, a rectangular area is selected by performing a touch-and-drag operation after the button B2 for a cleaning-prohibited area has been touched, as in the trace of pressing the button B3. As a result of this selection, a travel path of the cleaning robot 1 that bypasses the non-cleaned area R43 from the beginning of the next cleaning as a prohibited area is generated. Accordingly, an exceptional process due to an obstacle that is not indicated on the environment map 27 need not be performed, and the cleaning robot 1 can travel without delay.

As described above, after an operation result map has been presented to the user, the user is requested to input an instruction for an action to be taken next in accordance with the operation result map, and the action to be taken by the cleaning robot 1 next time can be changed in accordance with the result of input.

For example, if an operation result map that includes a non-cleaned portion is presented and an obstacle related to the non-cleaned portion is a temporary obstacle, the user removes the obstacle, and thereafter, the user can provide an instruction for cleaning again the non-cleaned portion by selecting the button B3 for a priority cleaning area. Alternatively, the user can provide an instruction for specifically and carefully cleaning the non-cleaned portion in the next cleaning.

For example, a case is assumed where, although a cleaning operation that corresponds to an operation result of "9" should originally be performed by passing through all sub-areas three times with an operation degree of "3" (the operation degree is set on a scale of "1" to "5", that is, five degrees, for example), an operation result map in which an operation result of some of the sub-areas is rated lower than the operation result of "9" is presented. If the reason for this case is because the cleaning robot 1 has successfully passed through a portion only once due to a temporary object, although the cleaning robot 1 originally should pass through the portion three times, an instruction can be provided instructing the cleaning robot 1 to pass through the portion, through which the cleaning robot 1 has successfully passed only once, two more times to clean the portion in the next cleaning when the obstacle is removed.

If an obstacle is located in the above-described portion for a long time due to a layout change, for example, an instruction can be provided for excluding the portion related to the obstacle from the cleaning area R3 in the next cleaning and thereafter (for excluding the related portion from the cleaning area R3 on the environment map 27).

If a temporary object is present and, although the present cleaning operation is partially insufficient, the user determines that no special action is necessary, a new instruction need not be specifically provided, and an instruction may be provided for performing the next cleaning operation to an extent similar to that in the present cleaning operation.

Second Embodiment

Other embodiments of the present invention are described below with reference to FIG. 12 and FIG. 13. For convenience of description, members having the same functions as those described in the above-described embodiment are given the same reference numerals, and description thereof is omitted.

(Creation of Operation Result Map Based on Shape of Operation Unit and Log of Position)

Figure 12:
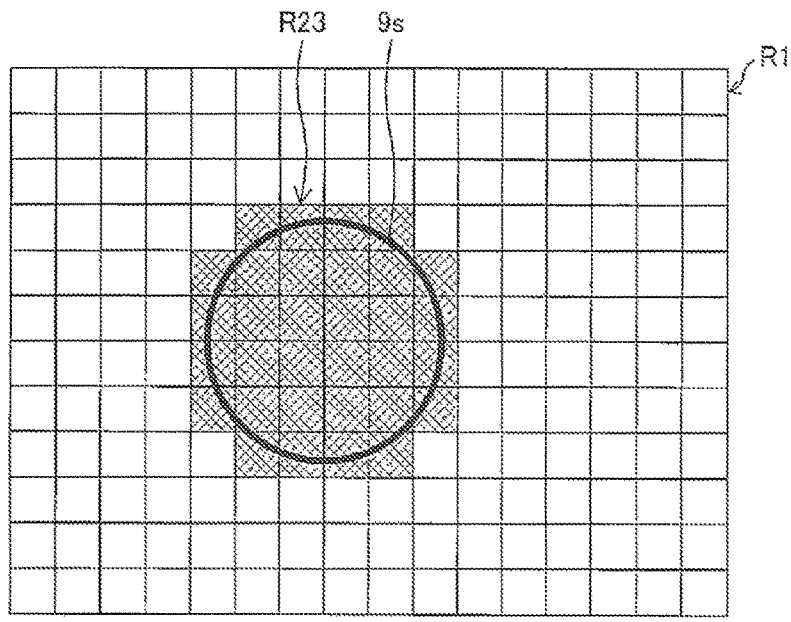
FIG. 12 is a diagram for describing a relationship between the shape of a brush provided in the cleaning robot according to a second embodiment and a cleaned area.
Figure 13:
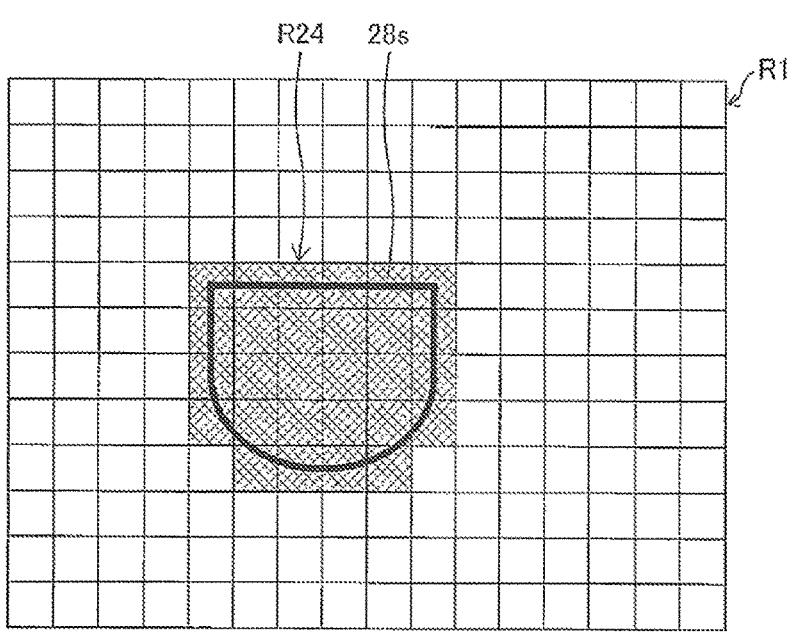
FIG. 13 is a diagram for describing a relationship between the shape of a squeegee provided in the cleaning robot and a cleaned area.

FIG. 12 is a diagram for describing a relationship between the shape 9s of the brush provided in the cleaning robot according to a second embodiment and a cleaned area R23. FIG. 13 is a diagram for describing a relationship between the shape 28s of a squeegee (second operation tool, operation unit) provided in the cleaning robot and a cleaned area R24.

The shape 9s of the cleaning brush 9 projected on the travel area R1 is a circle shape, and a portion that corresponds to the shape 9s, which is a circle shape, in the travel area R1 is the cleaned area R23. The cleaned area R23 is formed on the basis of the movement log of the shape 9s based on the movement log of the cleaning brush 9. An operation result map is created on the basis of the cleaned area R23.

The shape 28s of the squeegee projected on the travel area R1 is such that the lower portion has a semicircle shape and the upper portion has a rectangular shape, and a portion that corresponds to the shape 28s in the travel area R1 is the cleaned area R24. The cleaned area R24 is formed on the basis of the movement log of the shape 28s based on the movement log of the squeegee. An operation result map is created on the basis of the cleaned area R24.

As described above, when an operation result map is created by taking into consideration the shape of the operation unit in the method for creating an operation result map, a more appropriate operation result map can be created. The cleaning robot according to the second embodiment includes the cleaning brush 9 and the waste fluid tank 7 as the operation unit.

The cleaning brush 9 is used to scrub a floor sprinkled with water to loosen any dirt. The dirt is collected by using the squeegee and is sucked into the waste fluid tank 7 through vacuuming. The cleaning brush 9 and the squeegee that are used in the respective operations are provided at different positions of the cleaning robot, have different shapes, and have different roles. The method for creating an operation result map that takes into consideration the shape of the operation unit is illustrated in FIG. 12 and FIG. 13. FIG. 12 illustrates a case where the shape of the cleaning brush 9 is taken into consideration. FIG. 13 illustrates a case where the shape of the squeegee is taken into consideration. In this embodiment a floor sprinkled with water is scrubbed by using the cleaning brush 9 to loosen any dirt, and thereafter, the waste fluids are collected by using the squeegee, guided to an inlet for vacuuming, and sucked up through vacuuming. Therefore, the operation result map created on the basis of the shape 28s of the squeegee is more important than the operation result map based on the shape 9s of the cleaning brush 9 for evaluation of the result of cleaning from the viewpoint of a place where water is brought together.

Third Embodiment (Combination of Operation Result Maps)

An operation result map obtained by combining the operation result maps described in the second embodiment may be created.

For example, the cleaning brush corresponds to an area on the floor that is polished by using water, and the squeegee corresponds to an area from which the water used to polish the floor is collected thereafter. Therefore, when the operation result map based on the movement log of the shape 9s of the cleaning brush is combined with the operation result map based on the movement log of the shape 28s of the squeegee, a place from which the water has not been collected by using the squeegee is identified. Accordingly, further traveling can be performed to collect the water or the user themselves can perform post-processing for collecting the water on the basis of the result of combination.

Modification

In the first to third embodiments described above, an area through which the cleaning robot 1 has passed is indicated as a cleaned area and an area through which the cleaning robot 1 has not passed is indicated as a non-cleaned area in the operation result maps 28a and 28b; however, the present invention is not limited to this.

The operation result map creation unit 21 may create an operation result map while, for example, determining the indication mode (for example, a differentiated painting mode) of each sub-area indicated on the operation result map on the basis of the number of times the cleaning robot 1 has passed through the sub-area.

Alternatively, the operation result map creation unit 21 may create an operation result map while, for example, determining the indication mode (for example, a differentiated painting mode) of each sub-area indicated on the operation result map in accordance with the operation degree (the operation degree is set on a scale of "1" to "5", that is, five degrees, for example), of an operation performed by the operation unit, such as the cleaning brush 9. For example, a sub-area through which the cleaning robot 1 has passed two times with the operation degree of "1" is determined to have an operation result of "2", and a sub-area through which the cleaning robot 1 has passed once with the operation degree of "5" is determined to have an operation result of "5", based on which the operation result map is painted differently to allow a more detailed operation result map to be presented.

Fourth Embodiment (Cleaning Robot System (Autonomous Mobile Object System))

The cleaning robot 1 according to the first to third embodiments displays an operation result map on the operation panel 13; however, the present invention is not limited to this. The cleaning robot 1 may be provided with a communication unit and may be configured to transmit data representing an operation result map to a communication terminal owned by the user.

Figure 14:
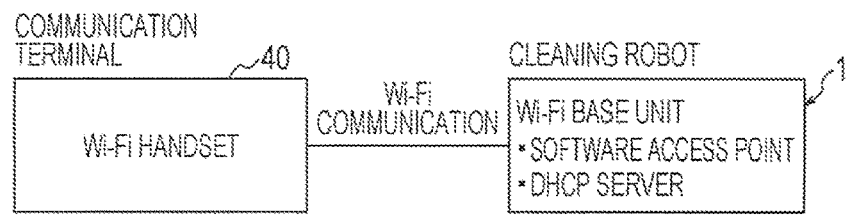
FIG. 14 is a block diagram illustrating a basic configuration of a cleaning robot system according to a fourth embodiment.

FIG. 14 is a block diagram illustrating a basic configuration of a cleaning robot system according to a fourth embodiment. Constituent elements that are the same as in the first to third embodiments are assigned the same reference numerals, and detailed description thereof is not repeatedly given.

The cleaning robot system includes the cleaning robot 1 (autonomous mobile object) and a communication terminal 40. The cleaning robot 1 and the communication terminal 40 communicate with each other over a wireless LAN (local area network). In a case where the wireless LAN is based on Wi-Fi (registered trademark), for example, the cleaning robot 1 operates as a Wi-Fi (registered trademark) base unit and the communication terminal 40 operates as a Wi-Fi (registered trademark) handset in Wi-Fi (registered trademark) communication. The cleaning robot 1 functions as a software access point and as a DHCP (Dynamic Host Configuration Protocol) server.

Figure 15:
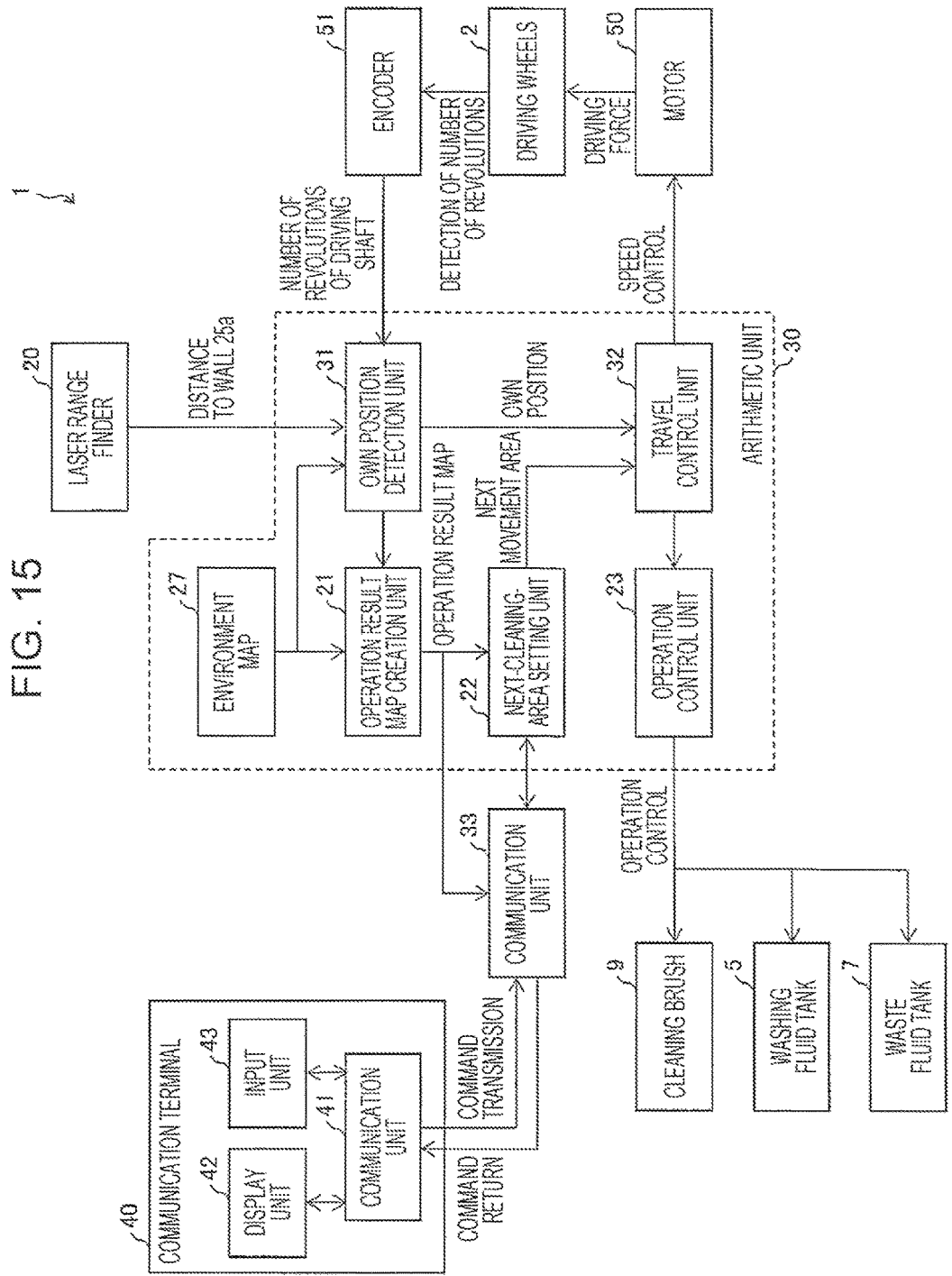
FIG. 15 is a block diagram illustrating a specific configuration of the cleaning robot system.

FIG. 15 is a block diagram illustrating a specific configuration of the cleaning robot system. The cleaning robot 1 is provided with a communication unit 33 (transmission unit). The communication terminal 40 includes a communication unit 41 (terminal reception unit), a display unit 42 (terminal display unit), and an input unit 43. The communication unit 33 transmits data that represents an operation result map created by the operation result map creation unit 21 to the communication unit 41 of the communication terminal 40. The communication unit 41 receives the data that represents the operation result map transmitted from the communication unit 33, and displays the operation result map on the display unit 42. The input unit 43 feeds input information input on the display unit 42 by using the buttons B1 to B3 and so on to the communication unit 41. The communication unit 41 transmits the input information from the input unit 43 to the communication unit 33 of the cleaning robot 1. The communication unit 33 feeds the input information transmitted from the communication unit 41 to the next-cleaning-area setting unit 22. The next-cleaning-area setting unit 22 sets the next cleaning area (next movement area) through which the body 24 of the cleaning robot 1 moves to perform cleaning next time on the basis of the input information fed from the communication unit 33.

FIG. 16 is a block diagram illustrating a basic configuration of another cleaning robot system according to the fourth embodiment. In FIG. 15, the cleaning robot and the communication terminal communicate with each other in accordance with Wi-Fi (registered trademark), for example; however, the present invention is not limited to this. The other cleaning robot system includes the cleaning robot 1 and a communication terminal 40a. The cleaning robot 1 may function as a server in socket communication based on TCP/IP (Transmission Control Protocol/Internet Protocol). The communication terminal 40a may function as a client in socket communication based on TCP/IP. The communication terminal 40a makes a request to the cleaning robot 1 by using a command, and the cleaning robot 1 makes a reply to the communication terminal 40a by using a command.

FIG. 17 is a diagram for describing example commands of the other cleaning robot system. When the communication terminal 40a transmits a command for requesting data that represents an operation result map to the cleaning robot 1, the cleaning robot 1 returns a command based on data that indicates the width of the operation result map, the length of the operation result map, and the attributes (wall, not cleaned, cleaned) of the respective grids. When the communication terminal 40a transmits, to the cleaning robot 1, a command that corresponds to the button B1 (FIG. 11) for selecting a cleaning area and data that represents a specified area specified in cleaning area selection, the cleaning robot 1 returns a command indicating that reception of the transmitted command and data is completed. When the communication terminal 40a transmits, to the cleaning robot 1, a command that corresponds to the button B2 (FIG. 11) for selecting a cleaning-prohibited area and data that represents a specified area specified in cleaning-prohibited area selection, the cleaning robot 1 returns a command indicating that reception of the transmitted command and data is completed. When the communication terminal 40a transmits, to the cleaning robot 1, a command that corresponds to the button B3 for selecting a priority cleaning area and data that represents a specified area specified in priority cleaning area selection, the cleaning robot 1 returns a command indicating that reception of the transmitted command and data is completed.

[Example of Implementation with Software]

The arithmetic unit 30 (specifically, the operation result map creation unit 30 and the next-cleaning-area setting unit 22) of the cleaning robot 1 may be implemented as a logic circuit (hardware) formed on an integrated circuit (IC chip), for example, or may be implemented with software by using a CPU (central processing unit).

In the latter case, the arithmetic unit 30 includes a CPU that executes instructions of a program, which is software for implementing the functions, a ROM (read-only memory) or a storage device (the ROM or the storage device is called "recording medium") to which the program and various types of data are recorded so as to be readable by a computer (or a CPU), and a RAM (random access memory) to which the program is loaded, for example. When the computer (or CPU) reads the program from the recording medium and executes the program, the object of the present invention is achieved. As the recording medium described above, a "non-transitory tangible medium", such as a tape, a disk, a card, a semiconductor memory, or a programmable logic circuit, for example, can be used. The program may be supplied to the computer via any transmission medium (a communication network or a broadcast wave, for example) over which the program can be transmitted. The present invention can be implemented in the form of a data signal embodied in a carrier wave with which the program is embodied by electronic transmission.

CONCLUSION

An autonomous mobile object (cleaning robot 1) according to a first aspect of the present invention includes: an operation unit (cleaning brush 9) that performs a predetermined operation while moving through an operation area (cleaning area) for which the operation is to be performed; a detection unit (own position detection unit 31) that detects a position of the operation unit in the operation area; a creation unit (operation result map creation unit 22) that creates an operation result map indicating an area, within the operation area, through which the operation unit has moved as an operation-performed area (cleaned area) on the basis of a log of the position of the operation unit detected by the detection unit; a display unit (operation panel 13) that displays the operation result map created by the creation unit; and a setting unit (next-cleaning-area setting unit 22) that sets, on the basis of the operation result map displayed on the display unit, a next movement area through which the operation unit moves to perform the operation next time.

With the above-described configuration, the next movement area through which the operation unit moves next time to perform the operation is set on the basis of the operation result map displayed on the display unit, and therefore, the extent of the movement area of the autonomous mobile object that performs an operation while moving can be appropriately fed back for the extent of the movement area in the next operation at a low cost.

According to a second aspect of the present invention, in the autonomous mobile object according to the first aspect, the operation area may be constituted by a plurality of sub-areas, and the creation unit may determine an indication mode of each sub-area among the sub-areas indicated on the operation result map on the basis of the number of times the operation unit has passed through the sub-area.

With the above-described configuration, a more detailed operation result map can be presented.

According to a third aspect of the present invention, in the autonomous mobile object according to the second aspect, the creation unit may determine the indication mode of each sub-area among the sub-areas indicated on the operation result map in accordance with a degree of an operation performed by the operation unit at the position of the operation unit detected by the detection unit.

With the above-described configuration, a more detailed operation result map can be presented.

According to a fourth aspect of the present invention, in the autonomous mobile object according to the first aspect, the display unit may display a button used to make the setting unit set an area other than the operation-performed area within the operation area as an operation-prohibited area for which the operation is prohibited.

With the above-described configuration, in a case where an obstacle remains present for a long time, the extent of the movement area of the autonomous mobile object can be appropriately fed back at a low cost.

According to a fifth aspect of the present invention, in the autonomous mobile object according to the first aspect, the display unit may display a button used to make the setting unit set an area other than the operation-performed area within the operation area as a priority operation area for which the operation is preferentially performed.

With the above-described configuration, in a case where an obstacle is temporarily present, the extent of the movement area of the autonomous mobile object can be appropriately fed back at a low cost.

According to a sixth aspect of the present invention, in the autonomous mobile object according to the first aspect, the creation unit may create the operation result map on the basis of a shape of the operation unit projected on the operation area and the log of the position.

With the above-described configuration, an operation result map in which a portion through which the operation unit has passed is expressed in a more detailed manner can be presented.

According to a seventh aspect of the present invention, in the autonomous mobile object according to the first aspect, the operation unit may include a first operation tool for performing a first operation and a second operation tool for performing a second operation different from the first operation, and the creation unit may create a creation result map in which an area through which the first operation tool has moved is indicated as a first operation tool area and an area through which the second operation tool has moved is indicated as a second operation tool area.

With the above-described configuration, an operation result map that provides a more detailed expression based on the operation tools can be presented.

According to an eighth aspect of the present invention, in the autonomous mobile object according to the seventh aspect, the predetermined operation may include an operation of cleaning a floor, the first operation tool may include a brush, and the second operation tool may include a squeegee.

With the above-described configuration, the extent of the cleaning area of the autonomous mobile object that performs cleaning while moving can be appropriately fed back for the extent of the cleaning area in the next cleaning at a low cost.

An autonomous mobile object system according to a ninth aspect of the present invention is an autonomous mobile object system including: an autonomous mobile object; and a communication terminal. The autonomous mobile object includes: an operation unit that performs a predetermined operation while moving through an operation area for which the operation is to be performed; a detection unit that detects a position of the operation unit in the operation area; a creation unit that creates an operation result map indicating an area, within the operation area, through which the operation unit has moved as an operation-performed area on the basis of a log of the position of the operation unit detected by the detection unit; and a transmission unit that transmits information representing the operation result map created by the creation unit to the communication terminal. The communication terminal includes: a terminal reception unit that receives the information transmitted by the transmission unit; and a terminal display unit that displays the operation result map on the basis of the information received by the terminal reception unit. The autonomous mobile object further includes a setting unit that sets, on the basis of the operation result map displayed on the terminal display unit, a next movement area through which the operation unit moves to perform the operation next time.

The present invention is not limited to the embodiments described above, and various modifications can be made within the scope set forth in the claims. An embodiment obtained by appropriately combining any technical means respectively disclosed in different embodiments also falls within the technical scope of the present invention. Further, technical means respectively disclosed in the embodiments can be combined to form a new technical feature.

INDUSTRIAL APPLICABILITY

The present invention can be used in an autonomous mobile object, such as a cleaning robot, that autonomously moves to perform an operation, and in an autonomous mobile object system.

REFERENCE SIGNS LIST 1 cleaning robot (autonomous mobile object)
2 driving wheels
3 trailing wheel
4 battery 5 washing fluid tank
6 washing fluid discharge portion
7 waste fluid tank
8 waste fluid suction inlet
9 cleaning brush (brush, first operation tool, operation unit)
9s shape
10 brush motor
12 protection member
13 operation panel (display unit)
14 emergency stop switch
15 travel control lever
16 handle
20 laser range finder
21 operation result map creation unit (creation unit)
22 next-cleaning-area setting unit (setting unit)
23 operation control unit
24 body
25a, 25b wall
26 path
27 environment map
28a, 28b operation result map
28s shape
30 arithmetic unit
31 own position detection unit (detection unit)
32 travel control unit
33 communication unit (transmission unit)
50 motor
40 communication terminal
40a communication terminal
41 communication unit (terminal reception unit)
42 display unit (terminal display unit)
43 input unit
R1 travel area
R3 cleaning area (operation area)
R21 to R24 cleaned area (operation-performed area)
R3 cleaning area (operation area)
R5 priority cleaning area (priority operation area)
R41 to R43 non-cleaned area
R5 priority cleaning area (priority operation area)

The invention claimed is:

1. An autonomous mobile object comprising:
an operation tool that performs a predetermined operation while moving through an operation area for which the predetermined operation is to be performed;
a detector that detects a position of the operation tool in the operation area;
an arithmetic unit including a processor;
the arithmetic unit including a creation unit that creates an operation result map indicating an area, within the operation area, through which the operation tool has moved as an operation-performed area on a basis of a log of the position of the operation tool detected by the detector;
a display that displays the operation result map created by the creation unit; and
the arithmetic unit further including a setting circuitry unit that sets, on a basis of the operation result map displayed on the display, a next movement area through which the operation tool moves to perform the predetermined operation next time.

2. The autonomous mobile object according to claim 1, wherein
the operation area includes a plurality of sub-areas, and
the creation unit determines an indication mode of each sub-area among the sub-areas indicated on the operation result map on a basis of a number of times that the operation tool has passed through the sub-area.

3. The autonomous mobile object according to claim 2, wherein the creation unit determines the indication mode of each sub-area among the sub-areas indicated on the operation result map in accordance with a degree of the predetermined operation performed by the operation tool at the position of the operation tool detected by the detector.

4. The autonomous mobile object according to claim 1, wherein the display displays a button used to make the setting unit set an area other than the operation-performed area within the operation area as an operation-prohibited area for which the predetermined operation is prohibited.

5. The autonomous mobile object according to claim 1, wherein the display displays a button used to make the setting unit set an area other than the operation-performed area within the operation area as a priority operation area for which the predetermined operation is preferentially performed.

6. The autonomous mobile object according to claim 1, wherein the creation unit creates the operation result map on a basis of a shape of the operation tool projected on the operation area and the log of the position.

7. The autonomous mobile object according to claim 1, wherein
the operation tool includes a first operation tool that performs a first operation and a second operation tool that performs a second operation different from the first operation, and
the creation unit creates a creation result map in which an area through which the first operation tool has moved is indicated as a first operation tool area and an area through which the second operation tool has moved is indicated as a second operation tool area.

8. The autonomous mobile object according to claim 7, wherein
the predetermined operation includes an operation of cleaning a floor,
the first operation tool includes a brush, and
the second operation tool includes a squeegee.

9. An autonomous mobile object system comprising:
an autonomous mobile object; and
a communication terminal, wherein
the autonomous mobile object includes:
an arithmetic unit including a processor,
an operation tool that performs a predetermined operation while moving through an operation area for which the operation is to be performed,
a detector that detects a position of the operation tool in the operation area,
the arithmetic unit including a creation unit that creates an operation result map indicating an area, within the operation area, through which the operation tool has moved as an operation-performed area on a basis of a log of the position of the operation tool detected by the detector, and
transmission circuitry that transmits information representing the operation result map created by the creation unit to the communication terminal,
the communication terminal includes:
terminal reception circuitry that receives the information transmitted by the transmission circuitry, and
a terminal display that displays the operation result map on a basis of the information received by the terminal reception circuitry, and the arithmetic unit further includes a setting unit that sets, on a basis of the operation result map displayed on the terminal display, a next movement area through which the operation tool moves to perform the predetermined operation a next time.

\* \* \* \* \*